United States Patent [19]

Strozeski et al.

[11] Patent Number: 5,146,050
[45] Date of Patent: Sep. 8, 1992

[54] METHOD AND APPARATUS FOR ACOUSTIC FORMATION DIP LOGGING

[75] Inventors: Bernard B. Strozeski; Roger R. Steinsiek; James O. Guy, all of Houston, Tex.

[73] Assignee: Western Atlas International, Inc., Houston, Tex.

[21] Appl. No.: 691,661

[22] Filed: Apr. 25, 1991

Related U.S. Application Data

[63] Continuation of Ser. No. 617,290, Nov. 16, 1990, abandoned, which is a continuation of Ser. No. 343,501, Apr. 25, 1989, abandoned.

[51] Int. Cl.$^5$ .............................................. G01V 1/40
[52] U.S. Cl. ................................. 181/102; 181/104; 181/105; 367/25; 367/35; 367/911; 310/327
[58] Field of Search ............... 367/25, 35, 162, 911, 367/27, 29, 33, 176; 181/102, 104, 105, 106, 401; 310/326, 327

[56] References Cited

U.S. PATENT DOCUMENTS

| | | | |
|---|---|---|---|
| 3,403,271 | 9/1968 | Lobdell et al. | 367/162 |
| 3,526,874 | 9/1970 | Schwartz | 340/15.5 |
| 3,542,150 | 11/1970 | Youmans et al. | 181/0.5 |
| 3,883,841 | 5/1975 | Norel et al. | 367/25 |
| 3,962,674 | 6/1976 | Howell | 340/15.5 |
| 4,255,798 | 2/1981 | Havira | 367/35 |
| 4,293,933 | 10/1981 | Park et al. | 367/25 |
| 4,495,605 | 1/1985 | Desbrandes et al. | 367/33 |
| 4,524,432 | 6/1985 | Johnson | 367/25 |
| 4,596,143 | 6/1986 | Norel | 367/35 |
| 4,641,724 | 2/1987 | Chow et al. | 367/28 |
| 4,805,156 | 2/1989 | Attali et al. | 367/35 |
| 4,808,996 | 2/1989 | Zimmer | 340/858 |

FOREIGN PATENT DOCUMENTS 2200451A 8/1988 United Kingdom .

OTHER PUBLICATIONS

Stuart-Bruges, W. P., "A Dipmeter for Use in Oil Based Muds", Societe pour l'Avancemente de l' Interpretation des Diagraphies (Paris, France-1984) (paper #32).

Primary Examiner—Ian J. Lobo
Attorney, Agent, or Firm—Darryl M. Spring

[57] ABSTRACT

Apparatus is provided for acoustically logging earth formations surrounding a borehole containing a known fluid, and includes a downhole tool adapted for longitudinal movement through the borehole, an acoustic transducer assembly for transmitting and receiving acoustic pulse energy, and extendable arms mounting the acoustic transducer assembly on the tool and adapted for lateral extension therefrom for positioning the acoustic transducer assembly in contact with the borehole wall. The acoustic transducer assembly further includes acoustic transducer means for generating acoustic pulse energy for coupling into the borehole fluid substantially free of acoustic ringing and directed an axis generally normal to the borehole wall surface. In addition, the apparatus includes transducer pad means carried by the arm means and mounting the acoustic transducer means, and adapted for contacting the borehole wall surface and positioning the transducer means in a predetermined closely-spaced offset relationship to the borehole wall. The transducer means receives the acoustic pulse energy reflected from the earth formation/borehole wall interface for application to a processing circuit for determining from the received reflected acoustic pulse energy a qualitative indication of the acoustic impedance of the earth formation.

23 Claims, 7 Drawing Sheets

METHOD AND APPARATUS FOR ACOUSTIC FORMATION DIP LOGGING

This is a continuation of application Ser. No. 617,290, filed Nov. 16, 1990 which is a continuation of application Ser. No. 343,501, filed Apr. 25, 1989, now both abandoned.

BACKGROUND OF THE INVENTION

This invention relates to methods and apparatus for determining the disposition of earth strata transversed by a borehole. More specifically, this invention relates to improved methods and apparatus using acoustic pulse energy transmission in fluid-filled boreholes for detecting the angle and azimuthal direction of the dip of earth formations.

It is conventional practice to use a dipmeter for determining the angle and azimuthal direction of the dip or inclination of the earth formation strata transversed by a borehole. One common form of dipmeter makes simultaneous resistivity measurements at three or four equally spaced electrodes in a plane perpendicular to the axis of the borehole. The electrodes provide a log of the resistivity of the surrounding formation as the electrode transverse the borehole wall. The logs from all of the resistivity electrodes are correlated in order to derive the relative displacement along the borehole of the points of intersection with the plane of the formation geological dip. Inertial sensors within the dip-meter provide additional information relating to the direction and slant of the borehole and the rotational attitude of the tool itself.

However, such resistivity dipmeters, while effective in boreholes without fluids or in water filled boreholes, have not been particularly effective in boreholes containing oil-base muds. This is primarily due to the insulative quality of the oil-base drilling fluid, since effective resistivity logging depends on the conductivity or resistivity measurement obtained through the drilling fluid and the insulating layer of mud cake adhering to the borehole wall. To overcome this problem to a degree, special "scratcher" and "poller" electrodes have been employed to scrape through the insulating layer of mudcake and then make contact with the formation in order to make the resistivity measurement. Such attempts have the objective to optimize the electrical contact of the electrode with the borehole wall. However, these attempts have met with varying degrees of success, often producing intermittent dip information.

Attempts have been made to use acoustical energy in obtaining information in order to determine formation dip measurements. The need is not for an absolute measurement, but for a log which can determine the change or transition from one earth stratum or formation to another. Attempts have been made to transmit acoustic pulse energy into the formation from a transducer in contact with the borehole wall and then to measure the transmission time of the acoustic energy through the formation to spaced receiving transducers also in contact with the borehole wall. Other attempts have been made to direct the acoustic pulse energy at the borehole wall/formation interface and to measure the acoustic pulse energy reflected therefrom, which would be indicative of the acoustic impedance of the formations. However, in both cases above described, it is not possible to place the acoustic transmitting transducer in continuous direct contact with the borehole wall because of the random wall geometry that occurs during drilling, and any invasion of the oil-base drilling fluid between the transducers and the borehole wall/formation interface will introduce some attenuation in the acoustic pulse energy. It has been found that the heavier the "weight" of the oil-base mud, the greater the attenuation of the acoustic energy, due to scattering produced by the "weighting" material, such as barite or hematite, and the viscosity of the oil-base mud. In addition, in a pulse-echo configuration, the "noise" generated by the ringing decay of the transmitting transducer complicates the detection and accurate determination of the reflected acoustic pulse energy. If a "delay line" spacing is built into the transducer design between the transducer crystal and the borehole fluid, such a "delay line" to delay the transducer ringing also introduces additional reflection and transmission losses. Further, in the first case above described, the "travel" through the formation itself to the receiving transducers introduces additional attenuation. Accordingly, the use of such acoustic pulse energy systems has been limited and the results have not been reliable when attempting to determine the geological dip of the formations traversed by the borehole. Accordingly, the present invention overcomes the deficiencies of the prior art by providing improved methods and apparatus for acoustic examination of the earth formations surrounding a borehole filled with a known fluid and for determining the geological dip of such formations.

SUMMARY OF THE INVENTION

In accordance with one principle of this invention, method and apparatus are provided for acoustically logging earth formations surrounding a borehole containing a known fluid, and include a downhole tool adapted for longitudinal movement through the borehole, an acoustic transducer assembly for transmitting and receiving acoustic pulse energy, and arm means mounting the acoustic transducer assembly on the tool and adapted for lateral extension therefrom for positioning the acoustic transducer assembly in contact with the borehole wall.

The acoustic transducer assembly further includes acoustic transducer means for generating acoustic pulse energy of a predetermined magnitude bidirectionally directed along an axis substantially normal to the borehole wall surface, transducer backing means cooperating with the acoustic transducer means for creating boundary conditions at the backing means/transducer means interface for coupling a majority of the acoustic pulse energy into the transducer backing means along the axis in a direction opposite to the direction toward said borehole wall for total absorption of the acoustic pulse energy therein and substantially decaying the ringing of the acoustic transducer means, and whereby the boundary conditions created at the transducer means/fluid interface provide a means for coupling the remainder of the acoustic pulse energy into the borehole fluid substantially free of acoustic ringing along the axis directed toward the borehole wall surface.

In addition, the apparatus includes transducer pad means carried by the arms means and mounting the acoustic transducer means, transducer backing means and adapted for contacting the borehole wall surface and positioning the transducer means in a predetermined closely-spaced offset relationship to the borehole wall, further, face plate means cooperating with the acoustic transducer means and in contact with the known borehole fluid provides coupling of the remaining acoustic pulse energy directed toward the borehole wall surface into said fluid with substantially zero transmission loss. The transducer means receives the acoustic pulse energy reflected from the earth formation/borehole wall interface for application to circuit means cooperating therewith for determining from the received reflected acoustic pulse energy a qualitative indication of the acoustic impedance of the earth formation reflecting the acoustic pulse energy at the earth formation/borehole wall interface.

BRIEF DESCRIPTION OF THE DRAWINGS

In order that the manner in which the above-recited advantages and features of the invention are attained can be understood in detail, a more particular description of the invention may be had by reference to specific embodiments thereof which are illustrated in the accompanying drawings, which drawings form a part of this specification.

In the drawings.

DETAILED DESCRIPTION OF THE PREFERRED EMBODIMENTS

Figure 1:
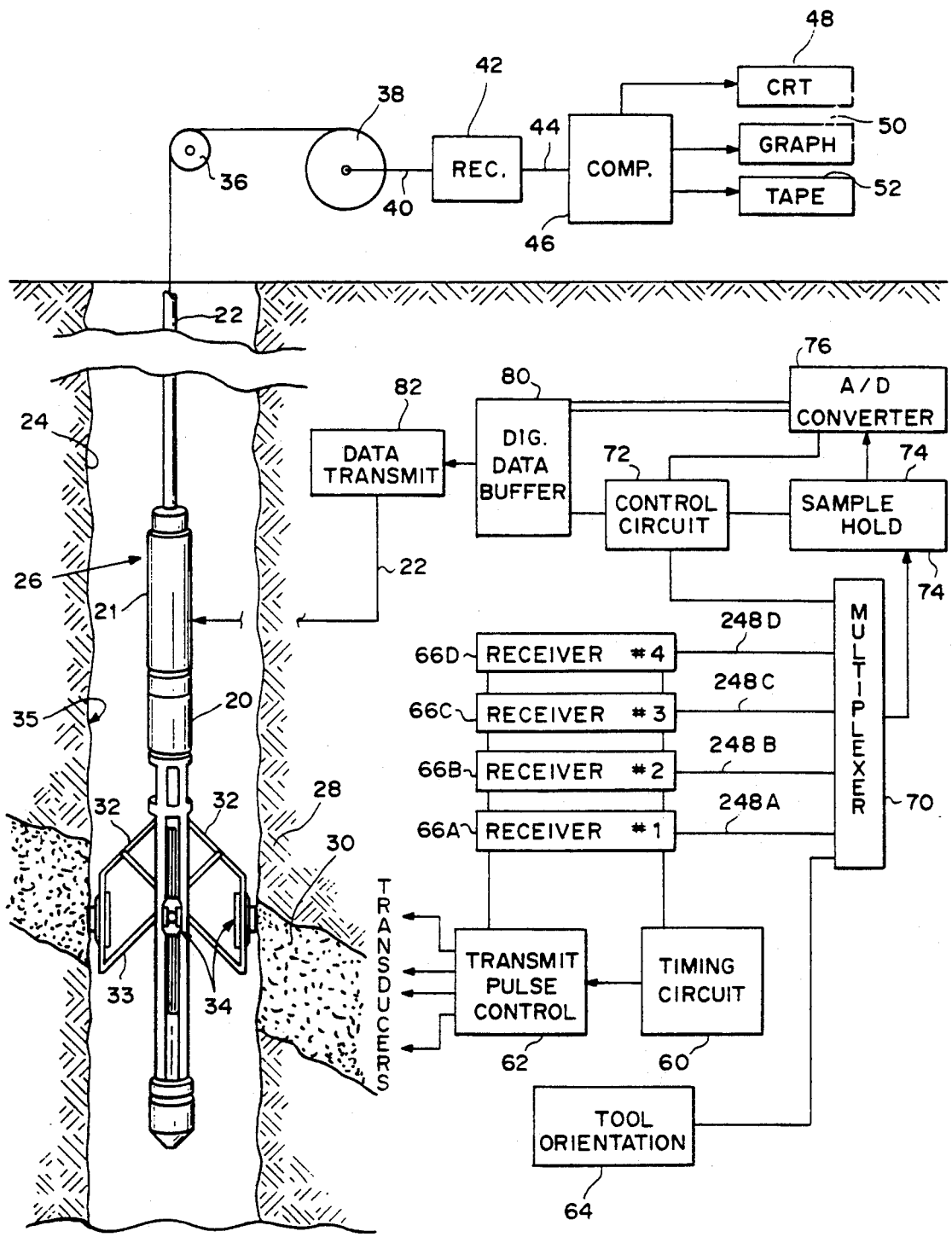
FIG. 1 is a schematic representation of an acoustic well logging system in accordance with this invention.
Figure 2:
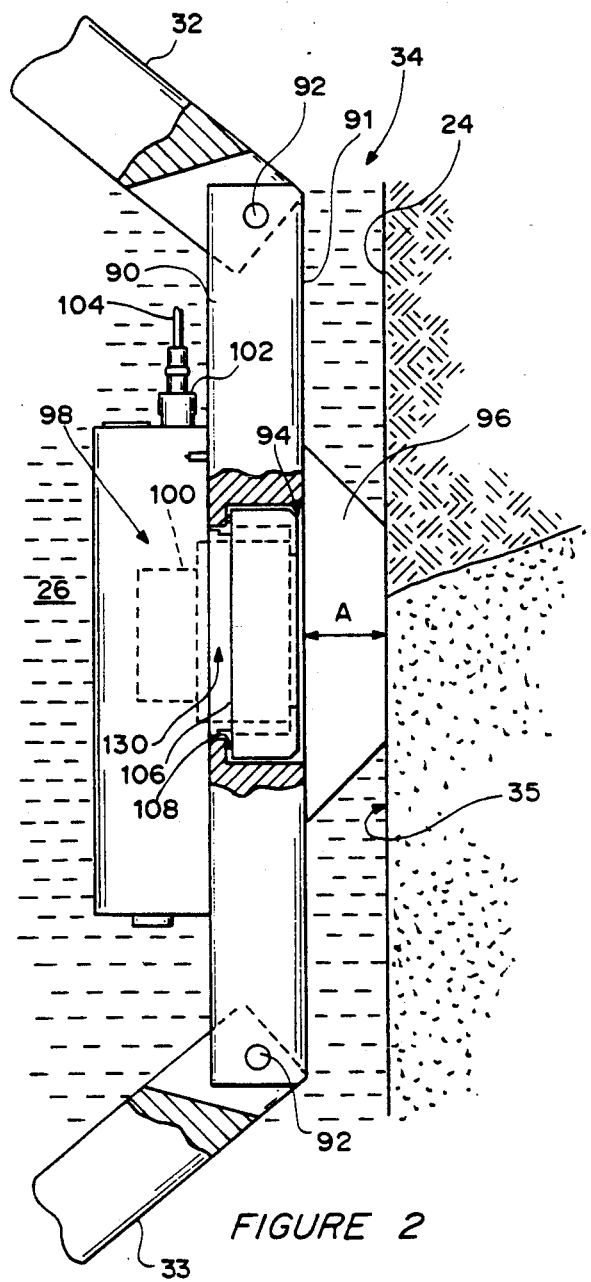
FIG. 2 is an elevational view of one transducer assembly and borehole wall contacting pad in contact with a portion of the borehole wall.
Figure 3:
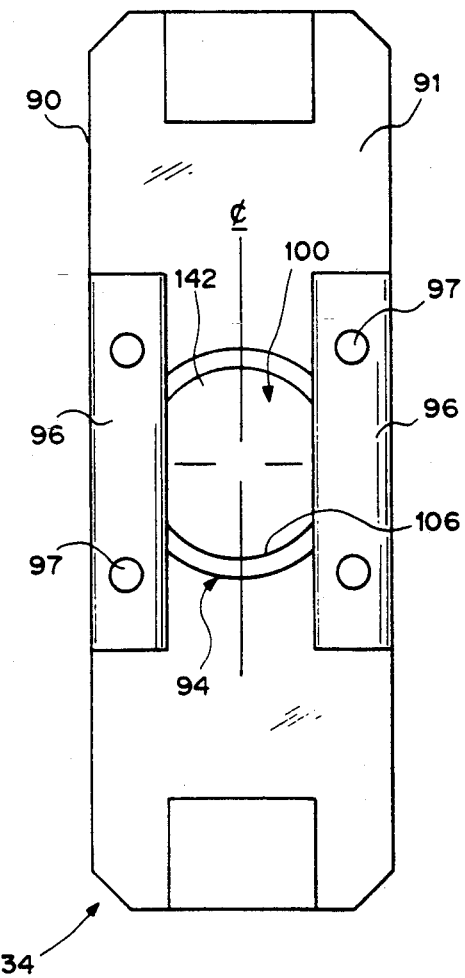
FIG. 3 is a front elevational view of the transducer assembly and borehole wall contacting pad shown in FIG. 2.
Figure 4:
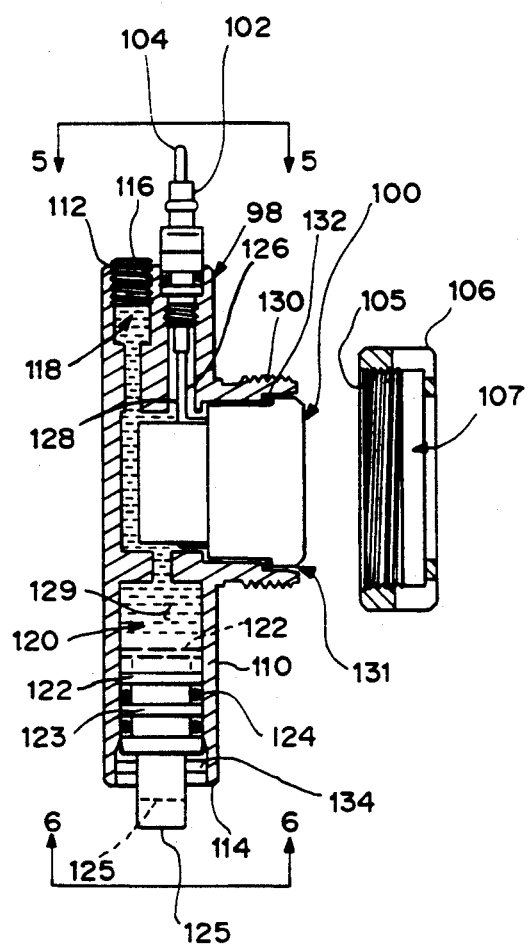
FIG. 4 is a vertical cross-sectional view of the transducer assembly shown in FIG. 2.
Figure 5:
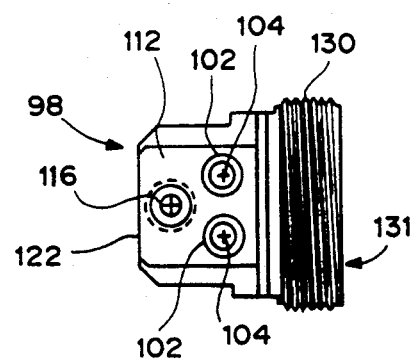
FIG. 5 is an upper end plan view of the transducer assembly as taken along liens 5—5 of FIG. 2.
Figure 6:
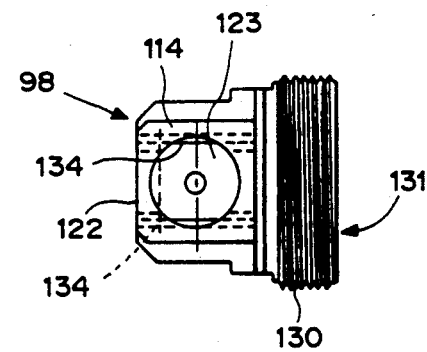
FIG. 6 is a lower end plan view of the transducer assembly as taken along lines 6—6 of FIG. 2.

Referring now to FIG. 1, an acoustic downhole tool or sonde 20 is shown traversing a borehole 24. The sonde 20 is supported by an armored cable 22 for obtaining acoustic logging information relating to the formations 28 and 30 (for example) surrounding the borehole 24. The cable 22 extends upwardly to the surface to pass over a sheave 36. The sheave 36 directs the cable to a reel 38 which spools and stores several thousand feet of the cable. The cable is connected by a suitable interconnecting line 40 to a receiver 42. The receiver 42 receives the acoustic logging data (as will hereinafter described in greater detail) and applies the data to a computer 46 through conductor set 44. The computer 46 analyzes the acoustic logging data received from the downhole sonde 20 and displays the acoustic logging information on a CRT screen 48, graphically records the acoustic logging data versus depth on a suitable logging graph at 50, and records and stores the logging data in a suitable medium such as on a magnetic tape at 52. The graphical recorder 50 and tape recorder 52 are connected by a mechanical or electronic means (not shown) to the sheave 36 for the purpose of determining the depth of sonde 20 in the borehole 24. This enables the data to be correlated to the depth in the borehole.

In typical operation, the sonde 20 is lowered to the bottom of the borehole 24 and then is retrieved from the borehole by spooling the cable onto the reel 38. Prior to being raised in the borehole 24, the sonde 20 (via commands sent from the surface) deploys a plurality of acoustic transducer assemblies 34 laterally from the sonde body and into physical contact with the borehole wall surface 35 by means of extension arms 32 and 33. In the acoustic diplog tool application as herein disclosed, the number of acoustic transducer assemblies 34 is at least three, and in the embodiment shown, includes four assemblies 34 positioned in a mutually spaced angular relationship about the axis of the sonde 20 and the borehole 24. The borehole contains a known fluid 26 over at least a substantial portion of its depth.

In an upper portion 21 of the sonde housing, suitable electronic circuitry is carried downhole for controlling the transmitting of the acoustic pulse energy, the receiving of the reflected echo energy from the borehole wall/earth formation interface, and preprocessing of the logging data prior to transmission to the surface receiver 42 via cable 22. A timing circuit 60 generates a clock pulse that controls the "exciting" or "firing" of each of the transducers to generate the acoustic pulses. The timing sequence or pulses are applied to a transmit pulse control circuit 62 for controlling the "firing" of the transducers associated with each of the acoustic transducer assemblies or means 34 deployed in the borehole. The echo pulse energy reflected from the formation/borehole wall interface is received by each transducer and applied to a corresponding receiver circuit 66A-66D, respectively. The received acoustic echo pulse energy signals are filtered, amplified and the positive peak signal values detected, as will be hereinafter described in greater detail. The acoustic echo or reflected pulse signals from receivers 66A-66D are applied to a conventional multiplexer circuit 70. In addition, sonde orientation information from an orientation module 64 is also applied as an input to the multiplexer circuit 70. The orientation module contains a suitable array of accelerometers, magnetometers and temperature sensors to provide azimuthal information relating to the direction and slant of the borehole 24 and the rotational attitude or position of the sonde 20 within the borehole.

The multiplexed data is applied to a conventional sample/hold circuit 74 and then is applied to an analog-to-digital (A/D) converter circuit 76 for digitizing the acoustic pulse data signals for transmission to the receiver 42 through the cable 22. The digitized acoustic pulse information is applied by the A/D converter 76 to a digital data buffer circuit 80. A control circuit 72 is interconnected to and controls the functions of the multiplexer 70, the sample/hold circuit 74, the A/D converter 76 and the buffer circuit 80. A data transmit circuit 82 receives the digitized acoustic data from buffer 80 and provides appropriate impedance matching and interconnection to cable 22 for transmitting acoustic logging data from sonde 20 to the surface electronic circuitry of receiver 42 as hereinabove described.

Referring now to FIGS. 2-7, the construction and operation of the acoustic transducer assemblies 34 will be described in greater detail. Each acoustic transducer assembly means 34 includes an elongated transducer pad or shoe member 90 adapted at either end for attachment to the sonde arm means 32/33 by suitable pins or connectors 92. The surface 91 of the transducer pad facing the borehole wall is substantially flat and carries a pair of spaced-apart spacer members 96. The spacer members are attached to the face 91 of the pad 90 by means of suitable conventional fasteners such as screws 97. The spacers 96 project from the face 91 of pad 90 a distance "A" and are designed to physically engage the surface of the borehole wall 24. The pad 90 has centrally disposed therethrough an annular opening 94 for receiving and mounting the acoustic transducer means 100 carried by the transducer housing 98. The transducer housing 98 has an annular projecting portion 130 that carries the transducer means 100 and is sized for insertion into and mating with the cavity 94 in the pad 90. An annular nut 106 threadably mates with external threads on the projecting annular portion 130 and engages pad shoulder 108 for securing the transducer housing 98 to pad 90 and positioning the transducer means 100 with respect to the face 91 of pad member 90.

The transducer housing 98 comprises an elongated body member 110 having an upper end 112, a lower end 114, and the above-described laterally projecting annular portion 130. Disposed longitudinally within the body member 110 is a generally axial upper cavity 118 interconnected to a lower cavity 120 and communicating with the central bore or cavity 131 provided centrally in the projecting annular member 130. The transducer means 100 is sized to mate with the cavity 131 of member 130 and seals internally therewith by means of an O-ring seal 132 disposed between the transducer means 100 and the interior of the projecting member 130. The nut 106, when threadably mounted on the annular projecting member 130, engages the transducer means 100 and securing it in the housing 110. The nut 106 has a central bore 107 therethrough for accommodating the transducer means face plate 142 (see FIG. 7) therein.

The lower cavity 120 of body member 110 is closed by means of a free piston 123 having an interior piston face 122, O-ring seals 124 and a projecting end 125. The piston 123 is held within the cavity 120 by means of a pair of spaced pins or screws 134 disposed through the housing 110 and engaging the outer side of piston 122 and limiting its outer movement. The cavities 120 and 118, and the remaining volume of cavity 131 surrounding transducer means 100 are filled with oil 129 for purposes to be hereinafter further described. The cavity 118 is closed by means of access plug 116 to retain the oil 129 within the sealed interior of the transducer housing 98. Electrical leads or connections 126 and 128 to the transducer means 100 are interconnected to external wires or cables 104 that exit the housing 98 through a pair of pressure sealed pin connectors 102 mounted in the upper end 112 of the housing 98.

Figure 7:
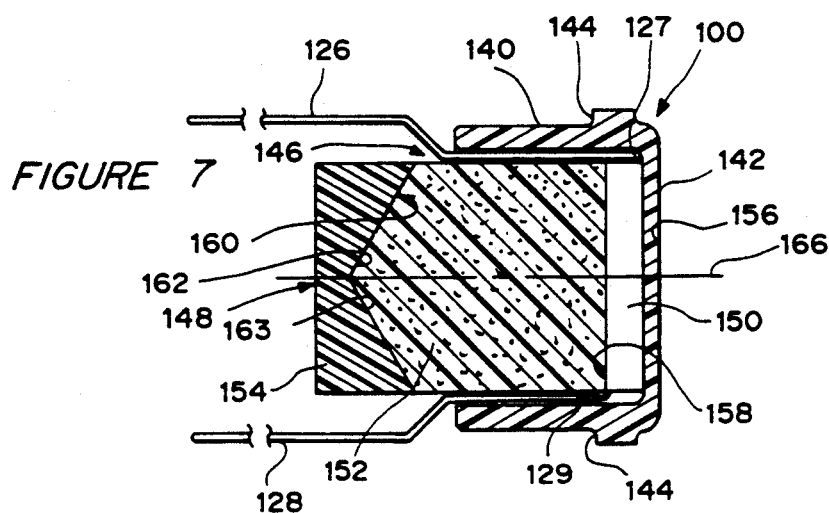
FIG. 7 is a vertical cross-sectional view of the transducer means 100 shown in FIG. 4.

Referring now primarily to FIG. 7, the construction of the acoustic transducer means 100 will be described in greater detail. The acoustic transducer means 100 comprises a piezoelectric transducer means 150, preferably a lead-metaniobate ceramic disc, the opposite faces of which are interconnected to ends 127 and 129 of the electrical leads 126 and 128, respectively. The front face of the transducer disc 150 is bonded at interface 156 to a cup-shaped member 140 having an interior cavity 146 and a lower flat face plate portion 142 through which the acoustic pulse energy generated by the transducer 150 is transmitted. The cup 140 and face plate 142 may be constructed of any suitable material that will be substantially transparent to the acoustic pulse energy produced by the transducer disc 15? and will provide essentially zero attenuation of the transmitted acoustic pulse. One suitable material is an elastomer product sold by the Dupont Company under the trademark VESPEL.

The transducer disc 150 has a backing section 152 composed of a suitable elastomer filled with high-density metal chips, such as tungsten chips. The backing section 152 is bonded to the disc 150 at interface 158. The elastomer of the backing section is selected to preferably provide an acoustic attenuation of about 30 dB/cm, and when filled with the high-density tungsten chips, provided an acoustic impedance of about 13.3 Mega MKS rayls. This is a desirable impedance match for the transducer disc 150, which for lead-metaniobate ceramic has an acoustic impedance of 21.7 Mega MKS rayls, since a 2-to-1 ratio is desirable. The backing section 152 has a second portion 154 that is constructed of another elastomer and is bonded thereto interface 160. The rear face 160 of the backing section 152 has a conically-shaped geometry comprising surfaces 162 and 163. The cup cavity 146 is sealed with a suitable sealing material to completely seal disc 150 and the disc bonded interfaces 156 and 158 and the ends 127 and 129 of leads 126 128, respectively, within the cup-shaped member 140.

Referring to FIGS. 1-7 and 10-12, the operation of the acoustic transducer assembly 34 and the acoustic transducer means 100 will be explained in greater detail. When the acoustic transducer assembly 34 is in contact with the borehole wall 35, the pair of spacers 96 position the face 91 of the transducer pad 90, spaced from the borehole wall 35 by the dimension "A" of the spacer. Since the outer surface of the transducer means face plate 142 projects through the retaining ring 106 and is flush with the outer face 91 of the pad, the spacers 96 position the acoustic transducer means 100 in a closely-spaced offset relationship to the borehole wall surface 35. As will be discussed further, it has been found that the maximum desirable offset (the dimension "A") is about 0.5 inches. In the borehole 24, the face plate 142 will be in direct contact with the fluid 26, whether it is water or an oil-base mud. In addition, the piston end 125 is also in contact with the borehole fluid 26. As the fluid pressure increases at greater borehole depths, such increased pressure will be applied directly to the face plate 142 and to the piston 123. The increased pressure applied to the free piston 123 drives the piston into the cavity 120 as shown by dotted lines at 122 and 125, thus transferring the borehole fluid pressure to the oil 129 and equalizing the pressure across the transducer means 100 in contact with the oil in cavity 131.

Figure 12:
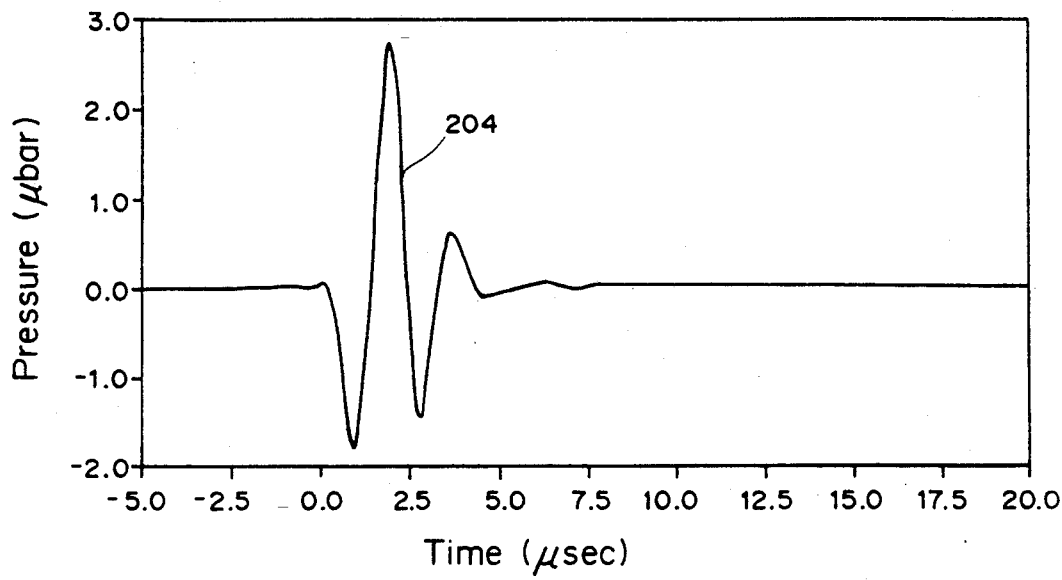
FIG. 12 is a graphical representation of the transmitted acoustic pressure pulse at the transducer/fluid interface versus time.

The transducer disc 150 is pulsed at a 4.0 KHz rate by the timing circuit 60. The transmit pulse control circuit 62 applies a 125 volt, 1 μsec unipolar pulse 198 to excite the transducer 150 (see FIG. 11), and the ringing across the transducer is shown at 200. The transmitted transducer pressure pulse leaving the face of the transducer is shown in FIG. 12. The construction of the transducer means 100 is designed for the transducer disc 150, when "excited" or "fired" by the pulse 198, to generate an acoustic pressure pulse of a first predetermined magnitude for propagation along the transducer axis 166 (see FIG. 7). However, since the backing section 152 has an acoustic impedance of about one-half that of the ceramic transducer disc 150, the acoustic pressure pulse will be propagated first into the backing section 152. The conically tapered geometry of the backing section slanted end faces 162 and 163 will reflect the acoustic pulse energy back through the backing section 152 and toward the disc 150 along the axis 166. The propagation path of the generated acoustic pulse 198 through backing section 152 toward the rear face 160, its reflection back and scattering resulting from faces 162 and 163 and the resultant propagation path back toward the disc 150 is sufficiently long to insure total absorption of the acoustic pulse energy coupled into the backing section. The impedance of the backing section 152 insures the ringing decay is at the 6 dB/ μsec rate above described.

Accordingly, the remaining unattenuated acoustic pressure pulse transmitted along axis 166 toward the borehole wall 35 will be substantially free of any transducer ringing interference. Further, selecting the thickness of the face plate 142 in contact with the transducer disc 150 on one side and the borehole fluid 26 on the other side to be one-sixteenth of the wavelength of the acoustic pulse will make the face plate 142 substantially "transparent" to the acoustic pulse energy and insure that the generated acoustic pulse energy directed toward the borehole wall/formation interface 35 is coupled into the borehole fluid with substantially zero transmission loss. The ability to direct an acoustic pulse toward the borehole wall 35 that is free of transducer ringing interference also insures that the "echo" acoustic pulse that is received by the transducer disc is substantially solely due to reflection of the acoustic pulse energy from the borehole wall/formation interface. Utilizing the backing section absorption technique above described also permits the transducer to be more closely spaced to the borehole wall/formation interface because the damping of the transducer ringing is maximized and permits the reflected echo to be received after the transducer ringing has ceased. Moving the transducer closer to the borehole wall/formation interface minimizes the attenuation of the acoustic pulse propagated through the fluid.

Figure 10:
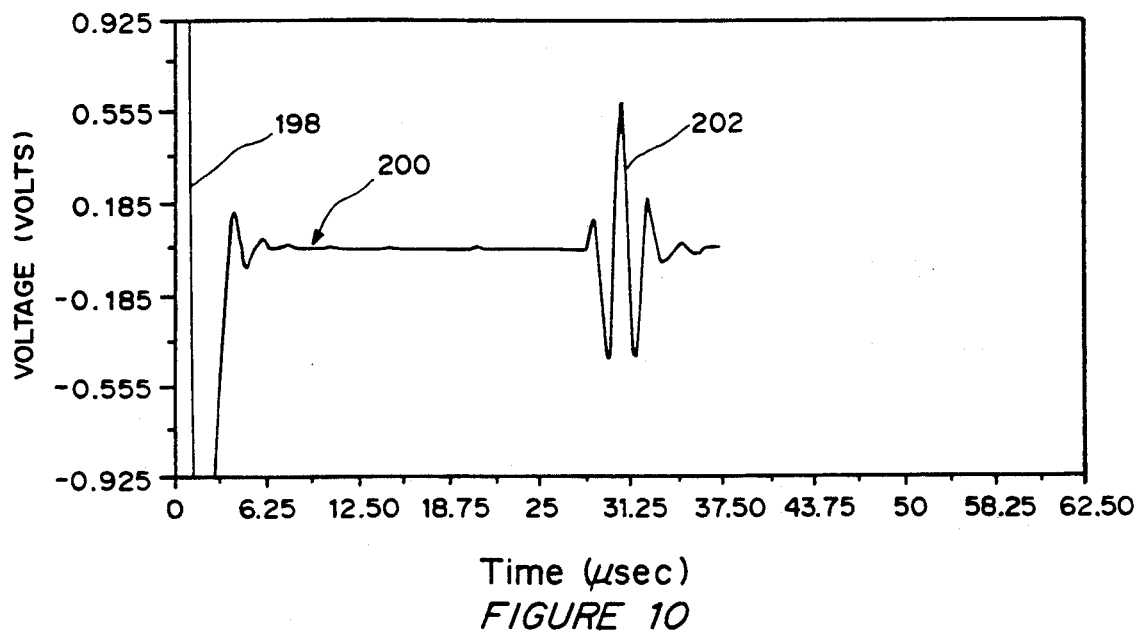
FIG. 10 is a graphical representation of an oscilloscope trace showing the voltage across the transmit-receive transducer versus time.
Figure 11:
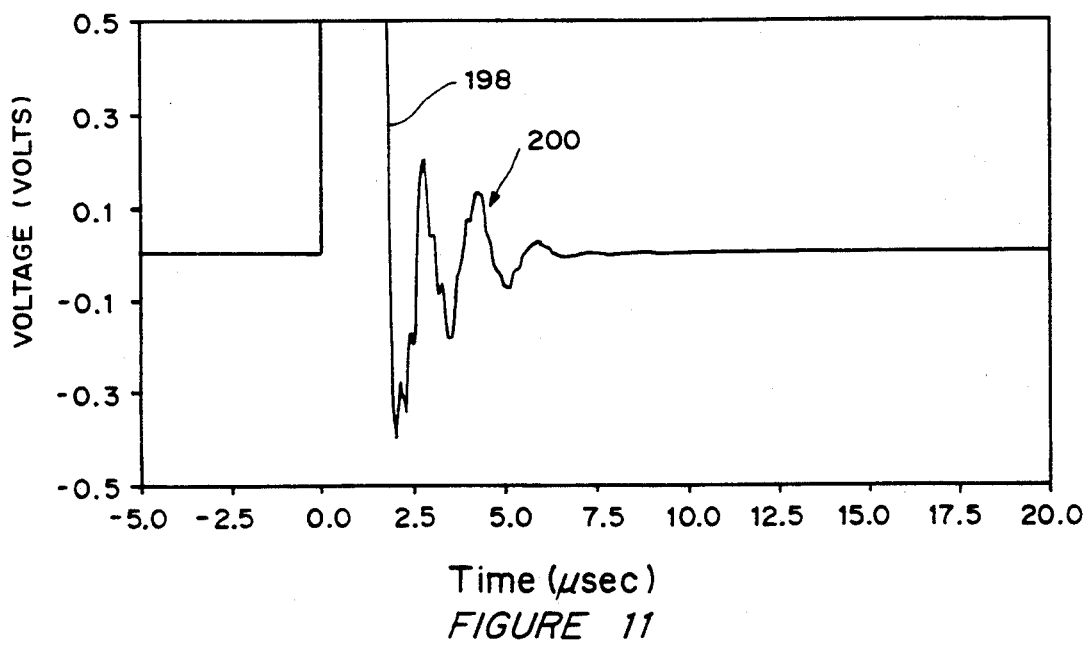
FIG. 11 is a graphical representation of an oscilloscope trace showing the "exciting" or "firing" voltage for the transducer and the ringing across the transducer versus time.

A typical measured voltage across the pulse-echo transducer as a function of time is shown in FIG. 10, where 198 identifies the later portion of the initial 125 volt excitation or firing pulse, followed by the rapid decay in the transducer ringing as shown at 200. The acoustic pressure pulse propagated toward the borehole wall is shown in FIG. 12 at 204, and the reflected or echo acoustic pulse received back at the transducer disc 150 is shown as 202 in FIG. 10, occurring some 30 μsecs later.

Figure 8:
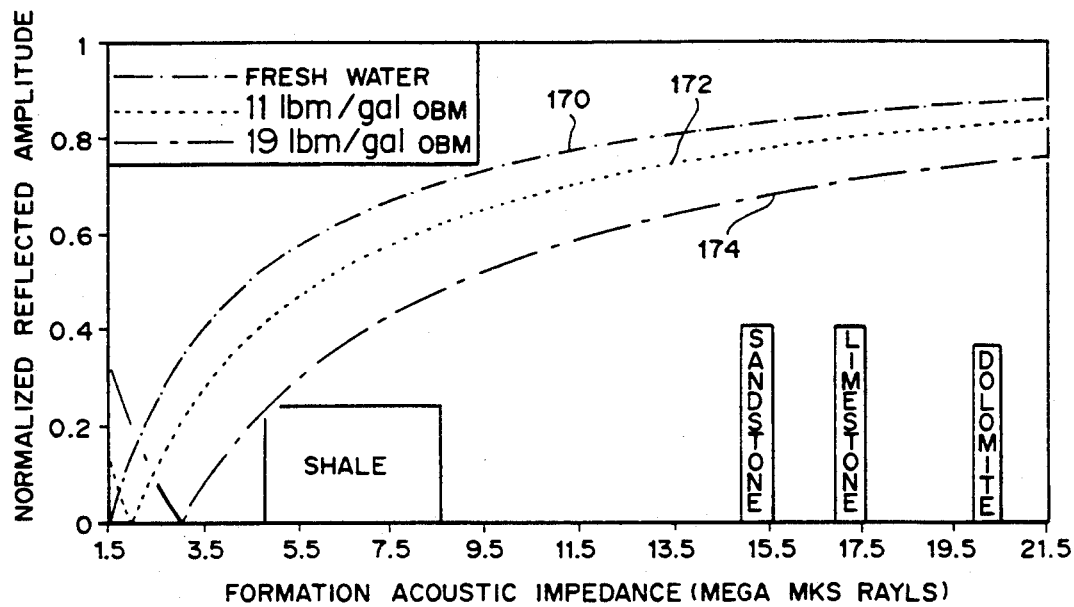
FIG. 8 is a graphical representation of the measurement dynamic range of the present invention for selected borehole fluids.

Experimental data has shown that acoustic velocity decreases with increasing weight of oil-base muds, and does not differ for muds of the same weight when weighted with hematite or barite. The higher acoustic impedance of the oil-base muds, in comparison to that of water (1.5 Mega MKS rayls), provides a greater measurement dynamic range, where the measurement dynamic range (in dB) is given by the following equation:

$$DR = 20 \log_{10} (R_{cd}/R_{cs})$$

where:
$R_{cd}$ = reflection coefficient for dolomite
$R_{cs}$ = reflection coefficient for soft shale FIG. 8 graphically shows the comparison of the measurement dynamic range of fresh water 170, 11 lbm/gal oil-base mud 172 and 19 lbm/gal oil-base mud 174 at 8000 psig. The measurement dynamic range is defined as the differences in the minimum reflected signal (from soft shale) and the maximum reflected signal (from zero percent porosity dolomite). In fresh water, the measurement dynamic range is 4.6 dB, whereas in 11 and 19 lbm/gal mud, it is 6.1 and 10.7 dB, respectively.

Figure 9:
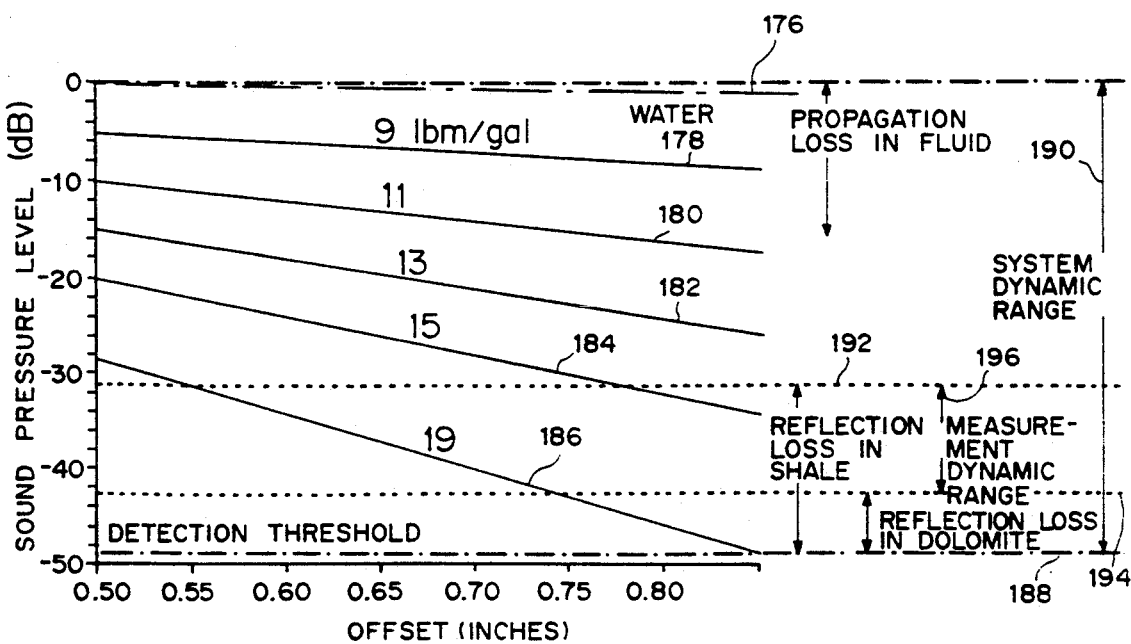
FIG. 9 is a graphical representation of nomograph formulated to predict the system response of the present invention in selected borehole fluids.

From results of investigating the acoustic properties of oil-base mud and knowledge acquired during the development of the pulse-echo transducer, a monograph (FIG. 9) was formulated to predict the system response in oil-base mud. Since hematite oil-base muds provide greater values of propagation loss, the chart specifically applies to these muds. However, from the experimental data, attenuation in 19 lbm/gal barite oil-base mud is approximately equal to that in 15 lbm/gal hematite oil-base mud, i.e., the 15 lbm/gal curve on the chart is the worst case scenario for barite.

In the monograph, propagation loss versus transducer offset for several weights of hermatite used is shown. Also shown is the measurement dynamic range (in 19 lbm/gal oil-base mud at 8,000 psig), and the system dynamic range (defined below). The curves for 9 lbm/gal and 13 lbm/gal muds were obtained by interpolation of the measured attenuation data for 11 and 15 lbm/gal hematite muds.

The measurement dynamic range is the difference between the lowest and highest reflection coefficients, equivalent to the highest and lowest reflection losses. The reflection coefficients for soft shale ($R_{cd}$) correspond to the normalized pressure amplitude values in FIG. 8 for 19 lbm/gal mud. As was mentioned earlier, the measurement dynamic range in that fluid is approximately 10 dB. The system dynamic range is the difference between the transmitted sound pressure level and the detection threshold of the transducers in the receive mode. Propagation loss and reflection loss both decrease the intensity of the received echo. When the sum of these losses exceeds the system dynamic range, the signal echo falls below the detection threshold.

To use the monograph, the weight of fluid in the borehole is identified (for example 15 lbm/gal). Then follow the propagation loss curve, as offset is increased, until it intersects the shale reflection loss line approximately 0.78 inches). At that offset, the shale reflection loss plus the propagation loss equals the system dynamic range, i.e., the signal level of the echo from shale is at the detection threshold of the system.

The results presented on this monograph strongly suggest that the most important criterion in the design of a pulse-echo transducer is to minimize the offset between the transducer and the formation. Furthermore, it is obvious from the monograph that in order to be able to measure a reflected pulse from soft shale in 19 lbm/gal (hematite mud), the transducer offset cannot be greater than one-half inch.

Figure 14:
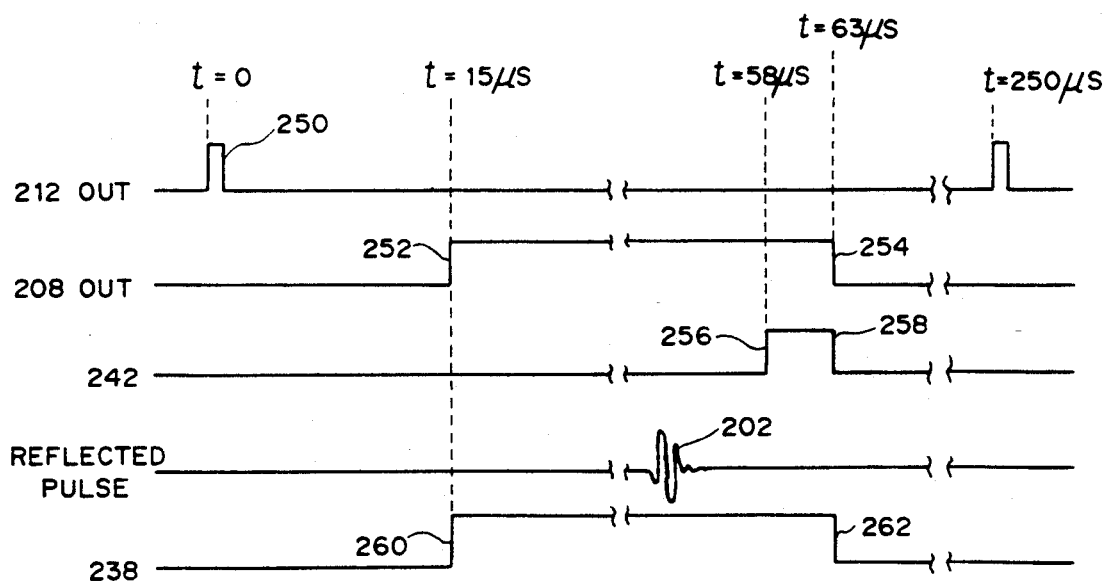
FIG. 14 is a graphical representation of several pulse waveforms helpful in understanding the operation of the system shown schematically in FIG. 13.
Figure 13:
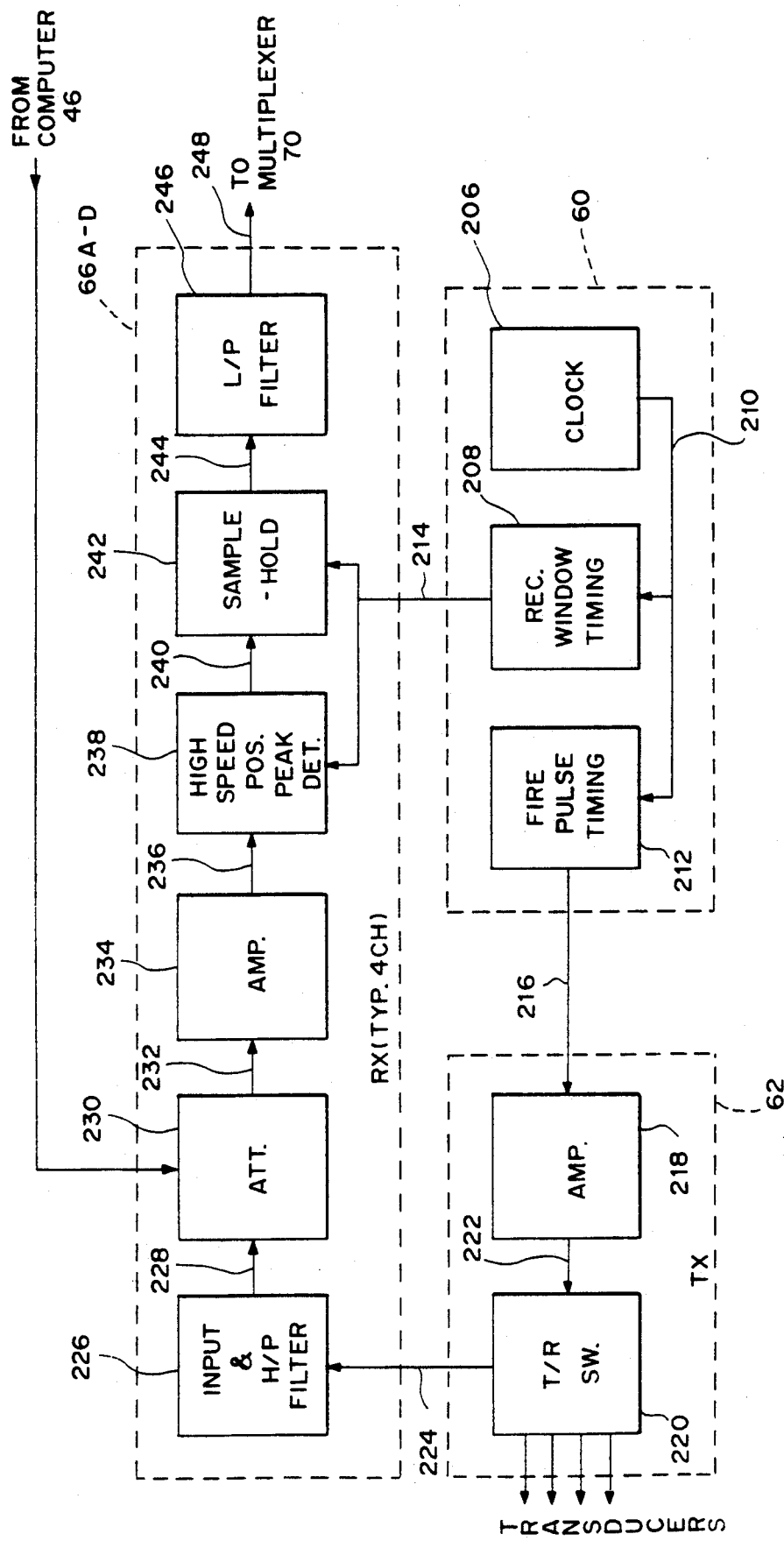
FIG. 13 is a more detailed block diagram schematic of the timing circuit 60, transmit pulse control circuit 62 and the receiver circuits 66 A-D shown in FIG. 1.

Referring now to FIGS. 1, and 13-14, a more detailed description of the downhole circuitry for the timing circuit 60, the transmit pulse control circuit 62 and the receiver circuits 66A-66D will be accomplished. The timing circuit 60 includes a clock oscillator circuit 206 which may preferably generate a 4.0 MHz clock signal. The clock signals are applied to a receive window timing circuit 208 and a "fire" pulse timing circuit 212 through line 210. The "fine" pulse timing circuit receives the clock 206 and generates the desired "excitation" or "fire" pulse frequency, which in the preferred embodiment is 4.0 KHz. The "fire" pulse is a unipolar 1.0 $\mu$sec duration pulse that is repeated every 250 $\mu$secs, and is applied to an amplifier 218 in the transmit pulse control circuit 62 via conductor 216 and is amplified to the 125 volt excitation voltage as hereinabove described (see FIG. 11) and applied through conductor 222 to a transmit/receive switch 220. In the transmit mode, the 125 volt excitation pulse is applied through the switch 220 to each of the transducer discs 150 to generate an acoustic pulse as hereinabove described.

The receive window timing circuit 208 generates a receive "window" pulse having a duration of from 15 $\mu$sec to 63 $\mu$sec and applies the pulse (shown as 252-254 in FIG. 14) to a sample/hold circuit 242 and a high speed positive peak detector circuit 238 in each of the receivers 66A-66D. When a reflected acoustic pulse is received by the transducer discs 150, a voltage is generated representative of the received signal and is shown as 202 in FIG. 14. The electrical signal representative of the echo pulse is applied from the transducers through switch 220 as an input to an input and high pass filter circuit 226. The circuit 226 provides input protection and signal damping and filtering. The output of circuit 226 is applied at 228 to an attenuator circuit 230. The attenuator circuit 230 provides attenuation from 0 dB to $-18$ dB in selective steps and the selected attenuation may be controlled from computer 46 (surface) depending on the type of fluid in the borehole, when coupled with the gain or amplifier circuit 234. The attenuated signal output of circuit 230 is applied through line 232 to the fixed gain or amplifier circuit 234 where the signal gain is increased by a fixed value, preferably about 45 dB. Depending on the type of fluid in the borehole, water to various weights of oil-base muds, the attenuator/gain combination of circuits 230 and 234 can be used to compensate and boost the signal strength corresponding to the attenuation occurring in the known borehole fluid. The signal is then applied via line 236 to the high speed positive peak detector circuit 238 and to the sample/hold circuit 242 through line 240. The circuits 238 and 240 are controlled by the receive "window" pulse 252-254 as hereinabove described. The detector 238 is gated open during the time interval between 15 $\mu$sec and 63 $\mu$sec as shown at 260-262 in FIG. 14. The sample/hold circuit has a gate time interval of approximately 3-5 $\mu$sec and is shown as signal trace 256-258 in FIG. 14. The output of the sample/hold circuit 242 is applied via 244 to a low pass filter circuit 246 for further wave sloping used then applied at 248 as an input to multiplexer 70 as shown in FIG. 1.

The signal received as an echo pulse reflected from the borehole wall/formation interface does not represent a quantitative determination of the formation acoustic impedance, but only offers a qualitative indication of such impedance for determining where changes in such impedance occur over a longitudinal course of travel of the tool within the borehole.

Numerous variations and modifications may be made in the structure herein described without departing from the present invention. Accordingly, it should be clearly understood that the forms of the invention herein described and shown in the figures of the accompanying drawings are illustrative only and are not intended to limit the scope of the invention.

We claim:

1. Apparatus for acoustically logging earth formations surrounding a borehole containing a known fluid, comprising:

a downhole sonde adapted for longitudinal movement through the borehole:

an acoustic transducer for generating acoustic pulse energy of a predetermined magnitude directed along the axis of said acoustic transducer substantially normal to the borehole wall surface and for receiving reflected acoustic pulse energy from said borehole formation;

backing means having an impedance approximately one-half the impedance of said transducer and cooperatively mounted radially inwardly thereof along said transducer axis and having an internal geometry aligned with said transducer axis for first receiving acoustic pulse energy generated by said transducer as directed along and parallel to said axis and absorbing, reflecting and reabsorbing substantially all of said first received acoustic pulse energy;

said acoustic transducer directing acoustic pulse energy substantially free of acoustic ringing along said axis toward the borehole wall surface;

a face plate member bonded to the surface of said acoustic transducer facing said borehole wall and in contact with the known borehole fluid and constructed of a material selected for coupling said transducer acoustic pulse energy directed toward the borehole wall surface into said fluid/face plate interface with substantially zero transmission loss;

housing means cooperating with said acoustic transducer, said backing means and said face plate member and sealing said acoustic transducer and backing means from said borehole fluid;

pressure compensating means cooperating with said housing means, said acoustic transducer and backing means mounted therein for equalizing the pressure exerted on said acoustic transducer and backing means within said housing means with the fluid exerted on said face plate member by said borehole fluid pressure;

transducer pad means cooperating with said housing means for carrying said acoustic transducer, said backing means and said face plate member and adapted for contacting the borehole wall surface and positioning said acoustic transducer in a predetermined closely-spaced offset relationship to the borehole wall surface;

arm means cooperating with said transducer pad means and said sonde for mounting said transducer pad means thereon and adapted for lateral extension therefrom for positioning said transducer pad means into contact with said borehole wall surface;

said acoustic transducer receiving said acoustic pulse energy reflected from the earth formation/borehole wall interface; and circuit means cooperating with said acoustic transducer for determining from said received reflected acoustic pulse energy an indication correlating to the acoustic impedance of the earth formation reflecting said acoustic pulse energy at said formation/borehole wall interface.

2. Apparatus for acoustically determining dip in the earth formation surrounding a borehole containing a known fluid, comprising:

a downhole sonde adapted for longitudinal movement through the borehole;

a plurality of acoustic transducers for generating acoustic pulse energy of a predetermined magnitude directed along the axis of each said acoustic transducers substantially normal to the borehole wall surface and each receiving reflected acoustic pulse energy from said borehole formation;

backing means having an impedance approximately one-half the impedance of each of said transducers and cooperatively mounted radially inwardly of each of said transducers along each said transducer axis and having an internal geometry aligned with said transducer axis for first receiving acoustic pulse energy generated by each of said transducers as directed along and parallel to said axis and absorbing, reflecting and reabsorbing substantially all of said first received acoustic pulse energy from each of said transducers, each of said acoustic transducers directing acoustic pulse energy substantially free of acoustic ringing along said axis toward the borehole wall surface;

a plurality of face plate members each one of which is bonded to the surface of one of said acoustic transducers facing said borehole wall and in contact with said known borehole fluid and constructed of a material selected for coupling said transducer acoustic pulse energy directed toward the borehole wall surface into said fluid/face plate interface with substantially zero transmission loss;

housing means cooperating with each of said acoustic transducers and said backing means and a face plate member and sealing said acoustic transducer and backing means from said borehole fluid;

pressure compensating means cooperating with said housing means and said acoustic transducer and backing means mounted therein for equalizing the pressure exerted on said acoustic transducer and backing means within said housing with the pressure exerted on said face plate member by said borehole fluid pressure;

transducer pad means cooperating with said housing means for carrying one of said acoustic transducers, backing means and a face plate member and adapted for contacting the borehole wall surface and positioning each of said acoustic transducers in a predetermined closely-spaced offset relationship to the borehole wall surface at said spaced locations;

arm means cooperating with transducer pad means and said sonde for mounting said transducer pad means thereon and adapted for lateral extension therefrom for positioning said transducer pad means into contact with said borehole wall surface and positioning each of said acoustic transducers in an angularly-spaced relationship about the axis of the borehole;

each of said acoustic transducers receiving acoustic pulse energy reflected from the earth formation/borehole wall interface at each of said angularly-spaced locations;

circuit means cooperating with said plurality of acoustic transducers for determining from said received reflected acoustic pulse energy an indication correlating to the acoustic impedance of the earth formation reflecting said acoustic pulse energy at said earth formation/borehole wall interface for each of said angularly-spaced locations in the borehole;

means for recording said acoustic impedance indications of the earth formations at each of said angularly-spaced locations developed at various depths along the borehole; and means for correlating the recorded formation acoustic impedance indications corresponding to said angularly-spaced locations in the borehole for determining dip in the formation strata transversed by the borehole.

3. The logging apparatus as described in claim 1, wherein said backing means comprises:

a first backing member composed of a material selected to have an acoustic impedance approximately one-half the acoustic impedance of said transducer bonded to the inner surface of said transducer facing away from the borehole wall and having a selected length projecting therefrom concentrically along said transducer axis, and a second backing member bonded to the projecting end of said first backing member and composed of a material selected to have a acoustic impedance greater than the impedance of said first backing member for forming an interface surface therebetween that acts as an acoustic reflecting surface for reflecting acoustic pulse energy from said transducer back into said first backing member.

4. The logging apparatus as described in claim 2, wherein said interface surface between said first and second backing members forms a conical surface configuration the axis of which coincides with the axis of said acoustic transducer and the apex of which faces away from said acoustic transducer reflecting acoustic energy back into said first backing member.

5. The logging apparatus as described in claim 4, wherein said first backing member is constructed of a selected elastomer material filled with high-density chips of a selected metal.

6. The logging apparatus as described in claim 5, wherein said high-density chips are made of tungsten.

7. The logging apparatus as described in claim 1, wherein said face plate member comprises a flat section having the same configuration as said acoustic transducer side to which said section is bonded, and further includes projecting sides for forming a cup-like configuration with said flat section closing one end for receiving said acoustic transducer and at least a portion of said backing means with said transducer bonded to the inner surface of said closed flat end section, said flat end section being composed of a material the acoustic impedance of which is selected to provide substantially zero attenuation of the acoustic pulse energy generated by said acoustic transducer.

8. The logging apparatus as described in claim 7, wherein said housing means comprises:

a closed housing defining a geometric volume and having an opening disposed in one side thereof communicating with the interior of said housing and sized for accepting the combination of said acoustic transducer, backing means and face plate member with said backing means and first side of said acoustic transducer projecting toward said housing interior and in communication therewith and said second side of said acoustic transducer and face plate member facing outwardly thereof, a sealing member disposed between said housing and said face plate member, retaining means cooperating with said housing and said sealing and face plate member for rigidly mounting said combination of said acoustic transducer, said backing means and said face plate means in said housing opening, sealing said housing opening from said known borehole fluid and permitting unhindered passage of said acoustic pulse energy from said acoustic transducer through said face plate member toward the borehole wall surface, said retaining means further cooperating with said transducer pad means for carrying said housing therewith, and electrical connector means cooperating with said housing and circuit means for permitting sealed electrical communication with the interior of said housing and said acoustic transducer and said circuit means.

9. The logging apparatus as described in claim 8, wherein said pressure compensating means comprises:
   a free piston disposed in an aperture in said housing and adapted for movement therein with one end surface communicating with the interior of said housing and the other end surface thereof communicating with the exterior of said housing,
   stop means cooperating with the interior of said housing and said free piston for limiting movement of said one end surface into the interior of said housing,
   sealing means cooperating with said piston and said housing for sealing the interior of said housing from the exterior of said housing, and
   a volume of fluid disposed within said housing interior and in contact with said one end surface of said piston, said acoustic transducer and said backing means for permitting pressure exerted by the known borehole fluid on the other end surface of said free piston to be transmitted to said fluid volume and said acoustic transducer and backing means for equalizing the pressure differential exerted on said acoustic transducer by said fluid volume and the pressure exerted on said face plate member and said transducer by the known borehole fluid.

10. The logging apparatus as described in claim 2, wherein said backing means comprises:
    a first backing member composed of a material selected to have an acoustic impedance approximately one-half the acoustic impedance of said transducer bonded to the inner surface of said transducer facing away from the borehole wall and having a selected length projecting therefrom concentrically along said transducer axis, and
    a second backing member bonded to the projecting end of said first backing member and composed of a material selected to have an acoustic impedance greater than the impedance of said first backing member for forming an interface surface therebetween that acts as an acoustic reflecting surface for reflecting acoustic pulse energy from said transducer back into said first backing member.

11. The logging apparatus as described in claim 10, wherein said interface surface between said first and second backing members forms a conical surface configuration the axis of which coincides with the axis of said acoustic transducer and the apex of which faces away from said acoustic transducer for reflecting acoustic energy back into said first backing member.

12. The logging apparatus as described in claim 11, wherein said first backing member is constructed of a selected elastomer material filled with high-density chips of a selected metal.

13. The logging apparatus as described in claim 12, wherein said high-density chips are made of tungsten.

14. The logging apparatus as described in claim 2, wherein said face plate member comprises a flat section having the same configuration as said acoustic transducer side to which said section is bonded, and further includes projecting sides for forming a cup-like configuration with said flat section closing one end for receiving said acoustic transducer and at least a portion of said backing means with said transducer bonded to the inner surface of said closed flat end section, said flat end section being composed of a material the acoustic impedance of which is selected to provide substantially zero attenuation of the acoustic pulse energy generated by said acoustic transducer.

15. The logging apparatus as described in claim 14, wherein said housing means comprises:
    a plurality of closed housings each defining a geometric volume and having an opening disposed in one side thereof communication with the interior of said housing and sized for accepting the combination of said acoustic transducer, backing means and face plate member with said backing means and first side of said acoustic transducer projecting toward said housing interior and in communication therewith and said second side of said acoustic transducer and face plate member facing outwardly thereof,
    a sealing member disposed between each said housing and said face plate members,
    retaining means cooperating with each of said housings and sealing and face plate members for rigidly mounting said combination of said acoustic transducer, said backing means and said face plate means in said housing opening, sealing said housing opening from said known borehole fluid and permitting unhindered passage of said acoustic pulse energy from said acoustic transducer through said face plate member toward the borehole wall surface, said retaining means further cooperating with said transducer pad means for carrying said plurality of housings therewith, and
    electrical connector means cooperating with each of said housings and circuit means for permitting sealed electrical communication with the interior of each of said housings and said acoustic transducer and said circuit means.

16. The logging apparatus as described in claim 15, wherein said pressure compensating means comprises:
    a free piston disposed in an aperture in each of said housings and adapted for movement therein with one end surface communicating with the interior of said housing and the other end surface thereof communicating with the exterior of said housing,
    stop means cooperating with the interior of each of said housings and said free piston for limiting movement of said one end surface into the interior of said housing, sealing means cooperating with said piston and each of said housings for sealing the interior of each of said housings from the exterior of said housings, and a volume of fluid disposed within each of said housings interior and in contact with said one end surface of said piston, said acoustic transducer and said backing means for permitting pressure exerted by the known borehole fluid on the other end surface of said free piston to be transmitted to said fluid volume and said acoustic transducer and backing means for equalizing the pressure differential exerted no said acoustic transducer by said fluid volume and the pressure exerted on said face plate member and said transducer by the known borehole fluid.

17. Apparatus for acoustically logging earth formations surrounding a borehole containing a known fluid, comprising:

a downhole sonde adapted for longitudinal movement through the borehole;

acoustic transducer means for transmitting and receiving acoustic pulse energy;

arm means mounting said acoustic transducer means on said sonde and adapted for lateral extension therefrom for positioning said acoustic transducer means in a predetermined closely-spaced offset relationship to the borehole wall;

said acoustic transducer means comprising:

an acoustic transducer for generating acoustic pulse energy of a predetermined magnitude bidirectionally directed along the axis of said acoustic transducer substantially normal to the borehole wall surface and for receiving reflected acoustic pulse energy from said borehole formation;

acoustic absorption backing means comprising:

a first backing member cooperating with said acoustic transducer and positioned radially inwardly of said acoustic transducer along said transducer axis and composed of a material selected to have an acoustic impedance approximately one-half the acoustic impedance of said transducer, said first backing member bonded to the surface of said transducer facing away from the borehole and projecting therefrom concentrically along said transducer axis for a selected length for first receiving acoustic pulse energy generated by said transducer and absorbing a substantial portion of said received first acoustic pulse energy, a second backing member composed of a material selected to have an acoustic impedance greater than the impedance of said first backing member and bonded to the projecting end of said first backing member for forming an interface surface therebetween having a geometric configuration that acts as an acoustic reflecting surface for reflecting the remaining first received acoustic pulse energy from said transducer back into said fist backing member for absorbing substantially all of said first received acoustic pulse energy, said acoustic transducer directing the acoustic pulse energy substantially free of acoustic ringing along said axis toward the borehole wall surface;

face plate means cooperating with said acoustic transducer and in contact with said known borehole fluid for coupling at the acoustic transducer/borehole fluid interface said acoustic pulse energy directed toward the borehole wall surface into said fluid with substantially zero transmission loss;

transducer pad means carried by said arm means and mounting said acoustic transducer, acoustic absorption backing means and face plate member and adapted for contacting the borehole wall surface and positioning said acoustic transducer in a predetermined closely-spaced offset relationship to the borehole wall;

said acoustic transducer receiving said acoustic pulse energy reflected from the earth formation/borehole wall interface; and circuit means cooperating with said acoustic transducer for determining from said received reflected acoustic pulse energy an indication correlating to the acoustic impedance of the earth formation reflecting said acoustic pulse energy at said formation/borehole wall interface.

18. The logging apparatus as described in claim 17, wherein said interface surface between said first and second backing members forms a conical configuration coincident with the axis of said transducer and has an apex which faces away from said transducers for forming a reflecting surface geometry that reflects acoustic energy back into said first backing member.

19. The logging apparatus as described in claim 18, wherein said first backing member is constructed of a first selected elastomer material filled with high-density chips of a selected metal.

20. The logging apparatus as described in claim 19, wherein said high-density chips are made of tungsten.

21. The logging apparatus as described in claim 18, wherein said second backing member is constructed of a second selected elastomer material.

22. The logging apparatus as described in claim 17 wherein said face plate means comprises a face plate member bonded to the surface of said acoustic transducer facing said borehole wall and in contact with the known borehole fluid and constructed of a material selected for coupling said transducer acoustic pulse energy directed toward the borehole wall surface into said fluid/face plate interface with substantially zero transmission loss.

23. The logging apparatus as described in claim 22, wherein said face plate member comprises a generally cup-shaped member having a closed flat end section and projecting sides for receiving said acoustic transducer and at least a portion of said acoustic absorption backing means with the side of said transducer facing the borehole wall bonded to the inner surface of said closed flat end section, said flat end section being composed of said material the acoustic impedance of which is selected to provide substantially zero attenuation of the acoustic pulse energy generated by said acoustic transducer.

* * * * *